United States Patent [19]

Torres

[11] Patent Number: 5,020,985

[45] Date of Patent: Jun. 4, 1991

[54] LAMINATE BENDING DEVICE

[76] Inventor: Carlos M. Torres, 719 W. Middle Turnpike, Manchester, Conn. 06040

[21] Appl. No.: 441,630

[22] Filed: Nov. 27, 1989

[51] Int. Cl.[5] .............................................. B29C 53/02
[52] U.S. Cl. .................................. 425/384; 264/339; 425/DIG. 41
[58] Field of Search ................ 425/384, 112, D16, 41, 425/383, 385, 391, 323; 264/285, 339; 72/342.1, 383, 387

[56] References Cited

U.S. PATENT DOCUMENTS

| | | | |
|---|---|---|---|
| 1,330,450 | 2/1920 | Person | 425/384 X |
| 3,315,618 | 1/1965 | Groff | 264/339 X |
| 3,561,057 | 2/1971 | Butzko | 425/384 X |
| 3,570,067 | 3/1971 | Jones et al. | 425/384 X |
| 3,597,799 | 8/1971 | Earle | 425/384 X |
| 3,822,160 | 7/1974 | LaBarge et al. | 264/339 X |
| 4,153,665 | 5/1979 | Vecchiotti et al. | 264/339 X |
| 4,185,069 | 1/1980 | Smith et al. | 425/384 X |
| 4,255,378 | 3/1981 | Miller et al. | 264/339 X |

Primary Examiner—Jay H. Woo
Assistant Examiner—Robert B. Davis
Attorney, Agent, or Firm—Jerry T. Kearns

[57] ABSTRACT

A laminate bending device includes a pair of parallel shafts extending outwardly through transverse slots in a front wall of a housing. A pair of clamping jaws on the shafts each include an elongated slot for the insertion of a narrow strip of a laminate material of the type sold under the trademark FORMICA. Each of the shafts are mounted within the housing for linear and rotary movement. A spring biases each of the clamping jaws toward a stop on the front wall of the housing. In use, a strip of laminate material is inserted into the slots of the clamping jaws, the spacing of which has been previously adjusted to determine the bending radius. A heating element is then activated to heat the strip and allow the spring biased force on the clamping jaws to bend the strip to the desired radius. A cooling mechanism is activated upon completion of the bending to cool the strip and set the deformed shape. A first timer allows adjustment of the duration of the heating period and is operative to initiate a second timer which is adjustable to control the duration of the cooling period.

20 Claims, 5 Drawing Sheets

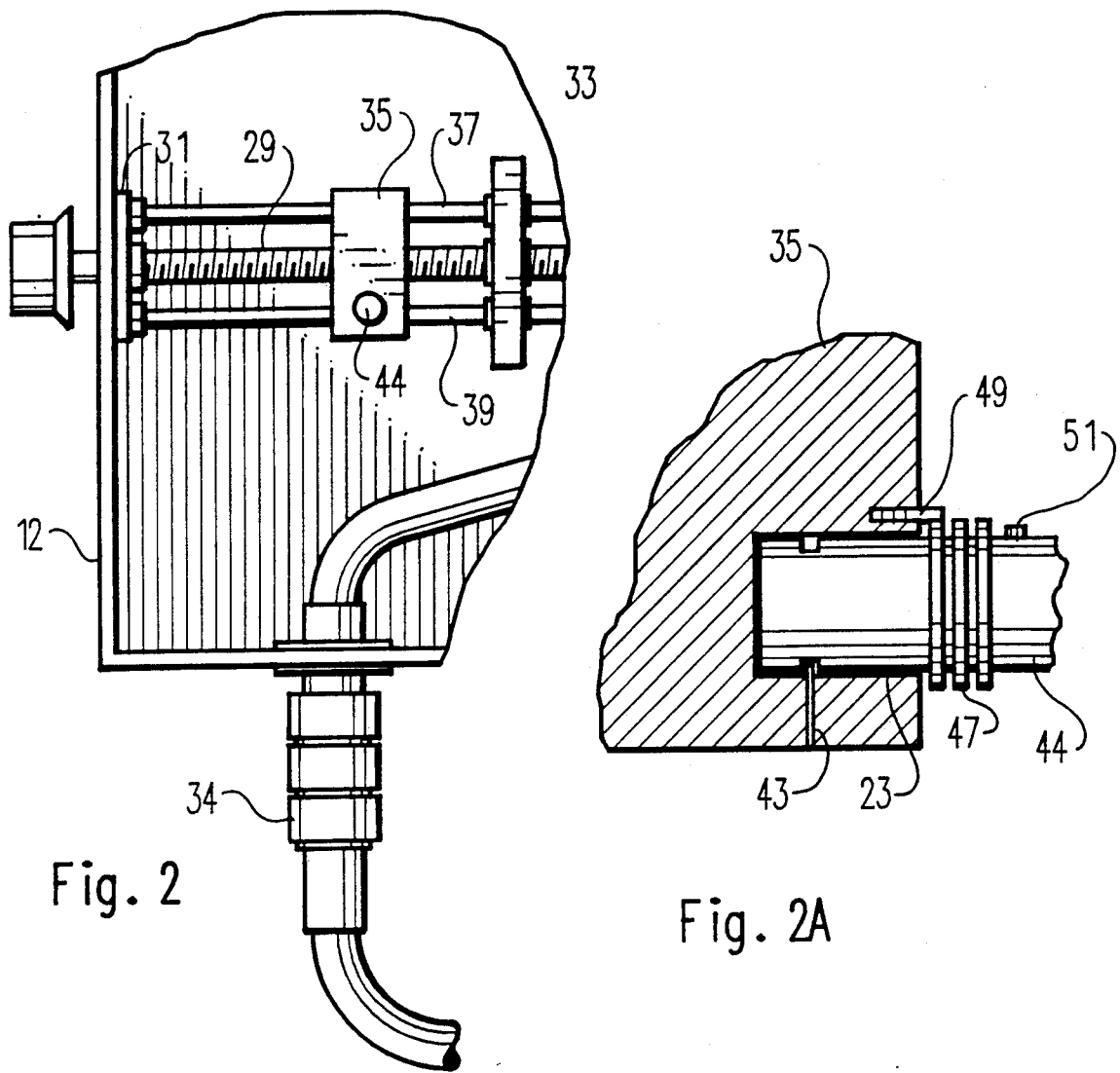
Fig. 2
Fig. 2A
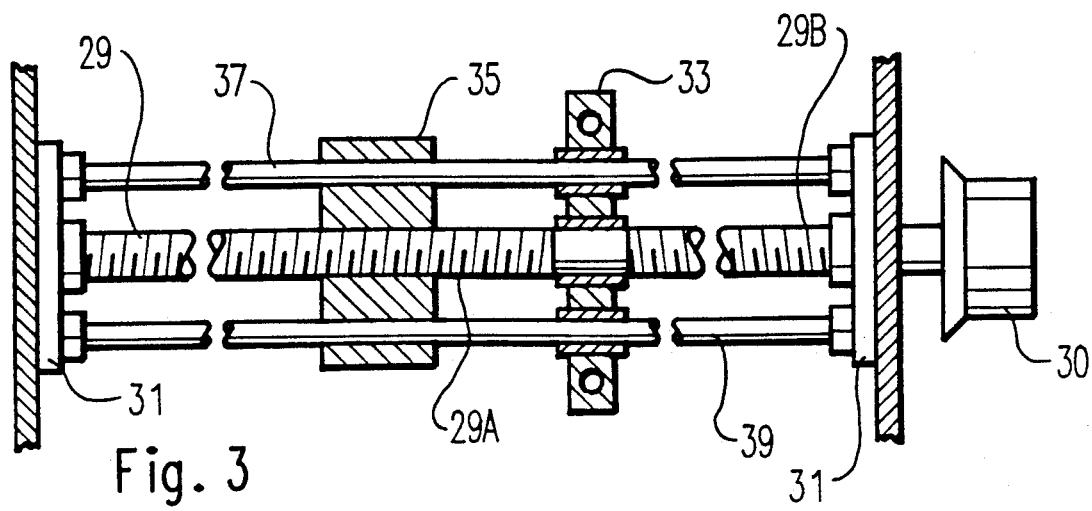
Fig. 3

LAMINATE BENDING DEVICE

BACKGROUND OF THE INVENTION

1. Field of the Invention

The present invention relates to bending devices, and more particularly pertains to a device for bending laminate of the type sold under the trademark FORMICA. This type of laminate material is frequently used in covering counter tops and other surfaces. In order to cover curved edge surfaces, a narrow laminate strip must be deformed to the correct radius. This is especially critical when covering the corner edge portions of counter tops. The laminate material is difficult to bend while cold, and is subject to cracking. Additionally, it is extremely difficult to manually bend a laminate strip to a desired radius. In order to overcome these problems, the present invention provides an automatic device for bending narrow laminate strips to a user adjustable predetermined radius.

2. Description of the Prior Art

Various manual bending devices including templates and guides have been proposed for bending plastic material to a desired shape. These devices typically include a heating element for heating a thermoplastic material to a temperature which allows deformation. These conventional forms of templates and heating devices do not allow the convenient bending of a laminate strip to a predetermined radius in an automatic fashion.

SUMMARY OF THE INVENTION

In view of the foregoing disadvantages inherent in the known types of bending devices now present in the prior art, the present invention provides an improved laminate bending device. As such, the general purpose of the present invention, which will be described subsequently in greater detail, is to provide a new and improved laminate bending device which has all the advantages of the prior art bending devices and none of the disadvantages.

To attain this, a representative embodiment of the concepts of the present invention is illustrated in the drawings and makes use of a laminate bending device which includes a pair of parallel shafts extending outwardly through transverse slots in a front wall of a housing. A pair of clamping jaws on the shafts each include an elongated slot for the insertion of a narrow strip of a laminate material of the type sold under the trademark FORMICA. Each of the shafts are mounted within the housing for linear and rotary movement. A spring biases each of the clamping jaws toward a stop on the front wall of the housing. In use, a strip of laminate material is inserted into the slots of the clamping jaws, the spacing of which has been previously adjusted to determine the bending radius. A heating element is then activated to heat the strip and allow the spring biased force on the clamping jaws to bend the strip to the desired radius. A cooling mechanism is activated upon completion of the bending to cool the strip and set the deformed shape. A first timer allows adjustment of the duration of the heating period and is operative to initiate a second timer which is adjustable to control the duration of the cooling period.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved laminate bending device which has all the advantages of the prior art bending devices and none of the disadvantages.

It is another object of the present invention to provide a new and improved laminate bending device which may be easily and efficiently manufactured and marketed.

It is a further object of the present invention to provide a new and improved laminate bending device which is of a durable and reliable construction.

An even further object of the present invention is to provide a new and improved laminate bending device which is susceptible of a low cost of manufacture with regard to both materials and labor, and which accordingly is then susceptible of low prices of sale to the consuming public, thereby making such bending devices economically available to the buying public.

Still yet another object of the present invention is to provide a new and improved laminate bending device which provides in the apparatuses and methods of the prior art some of the advantages thereof, while simultaneously overcoming some of the disadvantages normally associated therewith.

Still another object of the present invention is to provide a new and improved laminate bending device to bend narrow laminate strips to a predetermined user adjustable radius in an automatic fashion.

Yet another object of the present invention is to provide a new and improved laminate bending device which includes automatically actuated heating and cooling mechanisms to heat a laminate strip during bending and cool the laminate strip automatically upon completion of the bending operation.

Even still another object of the present invention is to provide a new and improved laminate bending device which includes a pair of clamping jaws mounted on rotatable shafts having an adjustable center line spacing for bending laminate strips to a variety of different curvatures.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a detail view, partially cut away, illustrating the traverse mechanism for adjusting the spacing of laminate clamping jaws for allowing a variety of different laminate curvatures to be achieved.

FIG. 2A is a detail view, partially in cross section, illustrating the rotational mounting of a clamping jaw supporting shaft on a reciprocal traverse block.

FIG. 3 is a detail view, partially in cross section, illustrating a lead screw mechanism for reciprocating a traverse block to allow adjustment of the radius of curvature of a laminate strip.

DESCRIPTION OF THE PREFERRED EMBODIMENT

Figure 1:
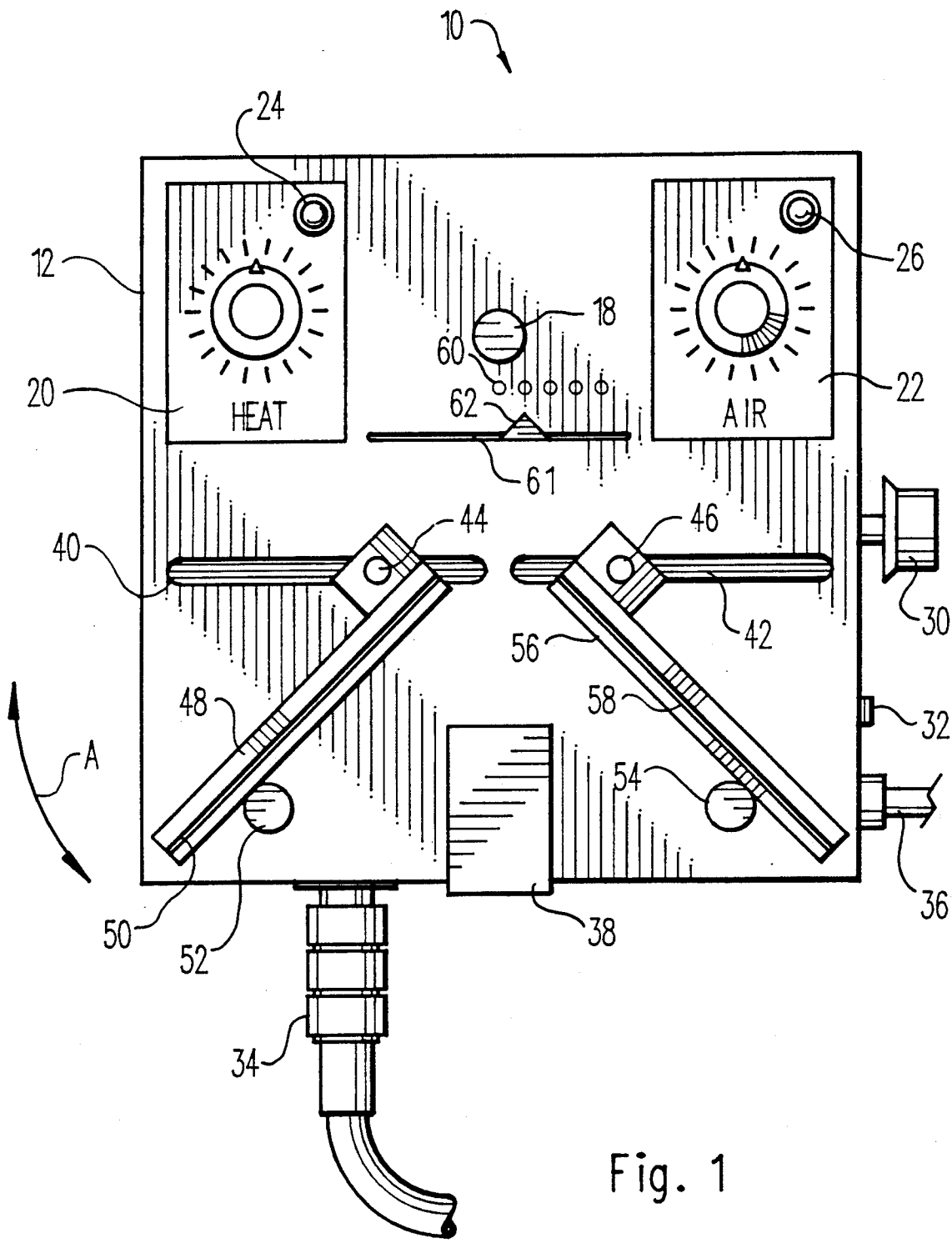
FIG. 1 is a front view of the laminate bending device of the present invention.

With reference now to the drawings, and in particular to FIG. 1 thereof, a new and improved laminate bending device embodying the principles and concepts of the present invention and generally designated by the reference numeral 10 will be described.

More specifically, it will be noted that the first embodiment 10 of the invention includes a housing 12 having a generally rectangular configuration preferably formed as a sheet metal box having a hollow interior and providing a secure structural mounting for the various components to be described subsequently. A compressed air cooling system for cooling a laminate strip subsequent to a bending operation includes a line 34 from a conventional air compressor. A nozzle 18 directs cooling air downwardly to a central bend portion of a laminate strip (not shown). A switch 32 selectively connects electrical components of the device to a conventional AC power source supplied by a power cord 36. A heating unit 38 is secured on a lower front central portion of the housing 12 and includes an electrical resistance heating element for heating the central portion of a laminate strip during a bending operation. A first timing unit 20 is user adjustable to initially activate the heating unit 38 and to control the duration of the heating interval. An indicating light 24 indicates operation of the heating unit 38. Upon termination of the heating time interval, a second timer 22 is initiated to control the duration of the time period during which compressed cooling air is supplied through the nozzle 18 to cool the deformed laminate strip and set the strip at the desired curvature. The timer 22 allows user adjustment of the cooling time interval through the control of an internal electrically actuated solenoid valve. An indicating light 26 is illuminated during the cooling time interval. The timers 20 and 22 afford independent adjustment of the heating and cooling time intervals which may be required depending upon the thickness of the laminate strip to be deformed as well as the composition of the particular laminate material. A pair of transverse collinear slots 40 and 42 are formed through a central portion of the front face of the housing 12. Parallel shafts 44 and 46 extend outwardly through the respective slots 40 and 42, with the center line of each of the shafts 44 and 46 extending in spaced parallel relation, generally perpendicular to the length of the slots 40 and 42. A pair of clamping jaws 48 and 56 are formed as elongated generally rectangular blocks which are secured adjacent one end portion on the distal ends of the shafts 44 and 46. The shafts 44 and 46 are mounted within the housing 12 for simultaneous movement in opposite directions along the lengths of the slots 40 and 42 to allow the center line spacing of the shafts 44 and 46 to be adjusted. A graduated scale 60 provided on the front face of the housing 12 includes linear measurement indicia allowing a user to set the center line spacing of the shafts 44 and 46 to determine a selected radius of curvature to which a laminate strip will be deformed and cooperates with a movable pointer 62 which extends through a slot 61. Each of the shafts 44 and 46 are also mounted for reciprocal rotation through a limited arcuate extent as indicated by the arrow A. The clamping jaws 48 and 56 each include a slit 50, 58 adapted to receive a thin narrow laminate strip. The laminate strip is inserted edgewise into the slits 50 and 58, with the center line of the desired curvature positioned at a midpoint between the shafts 44 and 46. Stop members 52 and 54 are secured to the front face of the housing 12 and serve to limit the arcuate movement of the jaws 48 and 56. A control knob 30 is connected to rotate a lead screw provided within the housing 12 to adjust the position of the shafts 44 and 46 along the length of the slots 40 and 42. The lead screw includes opposite hand thread portions to simultaneously move the shafts 44 and 46 in opposite directions. At the beginning of a laminate strip bending operation, the clamping jaws 48 and 56 are manually rotated to a position in which they extend parallel to the slots 40 and 42. A laminate strip to be deformed is then inserted edgewise into the slits 50 and 58, which are now disposed in a collinear relationship. The jaws 48 and 56 are manually held in collinear relation against the bias of internal spring mechanisms which urge the jaws 48 and 56 toward respective stop members 52 and 54. The laminate strip is then adjusted along the length of the slits 50 and 58 until the center line of the desired radius of curvature on the laminate strip is disposed centrally between the shafts 44 and 46. The jaws 48 and 56 are then released. The inserted laminate strip will then be initially elastically deformed by virtue of the spring force urging the jaws 48 and 56 toward the stops 52 and 54. However, in order to allow the laminate strip to be permanently deformed, it must be heated to allow thermoplastic deformation. At this point, the timer 20 is manually set to a predetermined heating time interval. The timer 20 then activates the electrical heating element 38 which is positioned beneath the center line of curvature on the laminate strip. The heating element 38 may include a manual control to regulate the intensity of the applied heat. As the laminate strip is heated, the spring force exerted on the clamping jaws 48 and 56 progressively deforms the laminate strip about the center line of the radius of curvature until the jaws 48 and 56 contact the stop members 52 and 54, as shown in the illustrated position. It should be noted that the slits 50 and 58 allow a limited relative movement between the jaws 48 and 56 and the laminate strip member during bending. This relative movement is required to compensate for the bend allowance of the strip during the bending process. At the expiration of the predetermined time interval, the timer 20 is operative through an internal relay mechanism to initiate the timer 22 which has been previously set to the desired cooling time interval duration. Upon initiation of the timer 22, the indicator light 26 is illuminated and an internal solenoid valve connects a supply of compressed air from a conduit 34 to the nozzle 18 which directs the cooling air flow on the previously heated curved portion of the laminate strip. The cooling process causes the laminate strip to be set in the deformed curvature, creating a permanent curved strip which may now be utilized to cover various curved surfaces such as a corner side edge portion of a counter top.

FIG. 2 illustrates a portion of the interior of the housing 12. The front face of the housing 12 has been removed to illustrate the traverse mechanism which allows adjustment of the position of the shafts 44 and 46 along the slots 40 and 42 illustrated in FIG. 1. The traverse mounting mechanism for the shaft 44 is illustrated. It should be understood that the mounting mechanism for the other shaft 46 is symmetrically constructed, and hence that portion has been cut away for purposes of clarity. A traverse block 35 has a threaded transverse bore in engagement with a lead screw 29. Spaced portions of the lead screw 29 are rotationally mounted in bearing blocks 31 and 33. The control knob 30 (FIG. 1) on the opposite end of the lead screw 29 allows manual rotation. As may now be understood, rotation of the control knob 30 causes the traverse block 35 to be moved along the length of the lead screw 29 in either direction, depending upon the direction of rotation of the knob 30. A pair of guide rods 37 and 39 extend through smooth bores provided through opposite ends of the traverse block 35 and form a linear guide track for the traverse block. The jaw mounting shaft 44 is rotationally mounted on the traverse block 35, in a manner to be subsequently described.

FIG. 2A illustrates the rotational mounting of the jaw supporting shaft 44 on the traverse block 35. A journal bore 23 is formed in the traverse block 35 and receives an inner end portion of the shaft 44. A circumferential groove 27 may be provided in the shaft 44 for the reception of a ball headed portion of a retaining screw or pin 43. The retaining screw or pin 43 prevents axial movement of the shaft 44, but allows rotational movement of the shaft 44 with respect to the traverse block 35. A torsional coil spring 47 surrounds the shaft 44 and has one end 49 secured to the traverse block 35 and an opposite end 51 secured to the shaft 44. The coil spring 47 is initially oriented to bias the jaw 48 (FIG. 1) toward the stop member 52. As the jaw 48 is moved upwardly into parallel relation with the slot 40, the coil spring 47 is wound up, creating a restorative spring force which urges the jaw 48 toward the stop 52. It should be understood that the rotational mounting of the shaft 46 is identically constructed.

FIG. 3 is a cross sectional detail view which further illustrates the construction of the traverse mechanism shown in FIG. 2. The lead screw 29 extends through a threaded internal bore formed through the traverse block 35 and is supported by a journal bore by a central mounting block 33. The lead screw 29 has opposite hand thread portions 29A and 29B, and opposite end portions are supported by stationary bearing blocks 31. The block 33 is secured to the housing 12. Guide rods 37 and 39 extend through smooth guide bores provided in the traverse block 35 forming a linear guide track. A second block (not shown), similar to the block 35, is mounted on the opposite hand portion 29B for simultaneous movement, in an opposite direction, with the block 35 on the lead screw portion 29A. This second block mounts the shaft 46 in the manner illustrated in FIG. 2A, and also mounts the pointer, 62 shown in FIG. 1, for movement along the slot 61.

Figure 4:
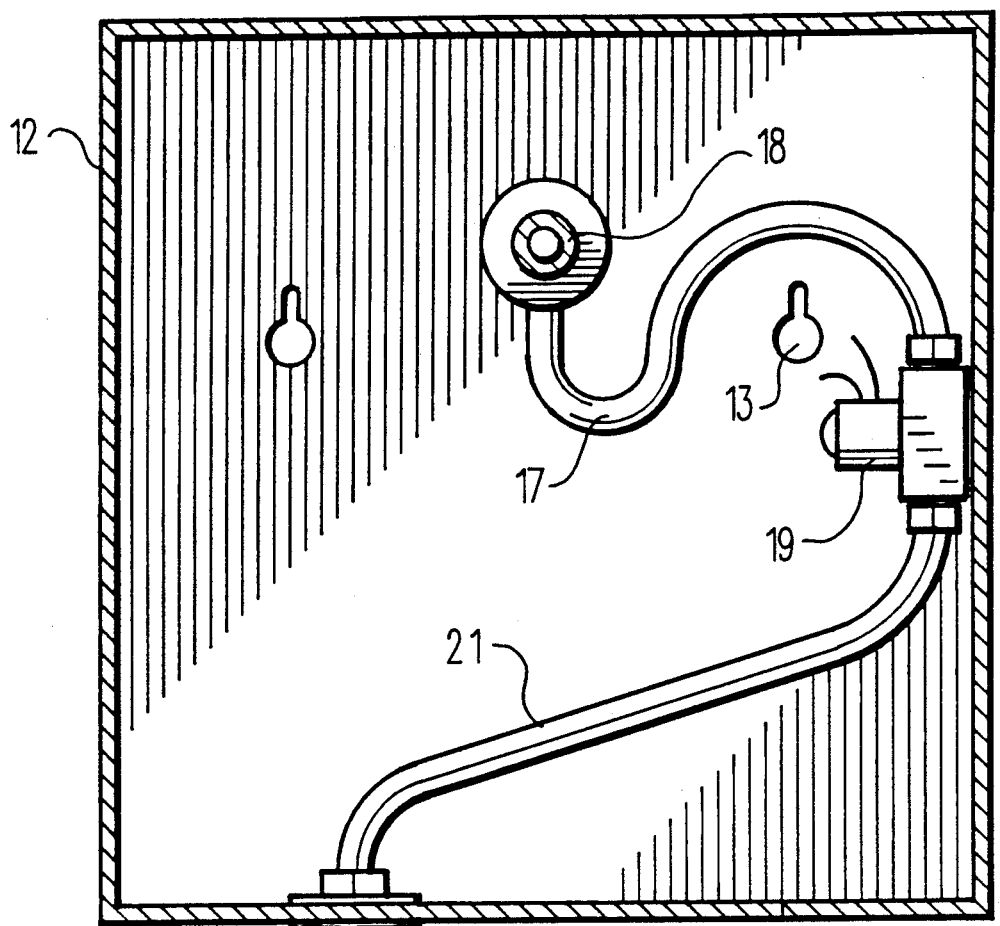
FIG. 4 is a cross sectional view which illustrates the compressed air system for cooling a laminate strip subsequent to bending.

FIG. 4 illustrates the compressed air cooling system of the laminate bending device of the present invention. A conduit 34 is connected to a conventional compressed air source such as an electric compressor. An internal tubing 17 is connected to a connected at one end to the discharge nozzle 18. An opposite end of the tubing 17 is connected to an electrically actuated solenoid valve 19. Prior to a bending operation, the valve 19 will be closed. The solenoid valve 19 is opened upon initiation of the timer 22 (FIG. 1) upon termination of the heating time interval. Upon opening of the valve 19, a compressed air supply is provided through a tubing 21, through the valve 19, tubing 17 and through the discharge nozzle 18. The nozzle 18 spreads the cooling air flow across the previously heated laminated strip curved area, thus setting the curvature. Upon termination of the cooling operation, the strip is manually withdrawn from the slits 50 and 58 and is now ready for use. A pair of keyhole-shaped 13 apertures may be formed through a back wall of the housing 12 for mounting the housing 12 on a vertical wall surface using conventional fasteners.

Figure 5:
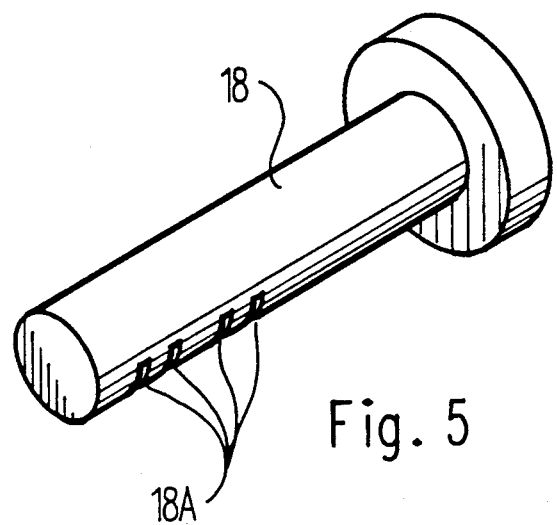
FIG. 5 is a detail view which illustrates a nozzle for directing cooling air upon a laminate strip.

FIG. 5 is a perspective view illustrating the discharge nozzle 18 which is in the form of a cylindrical conduit and includes a plurality of arcuate discharge slits 18A.

Figure 6:
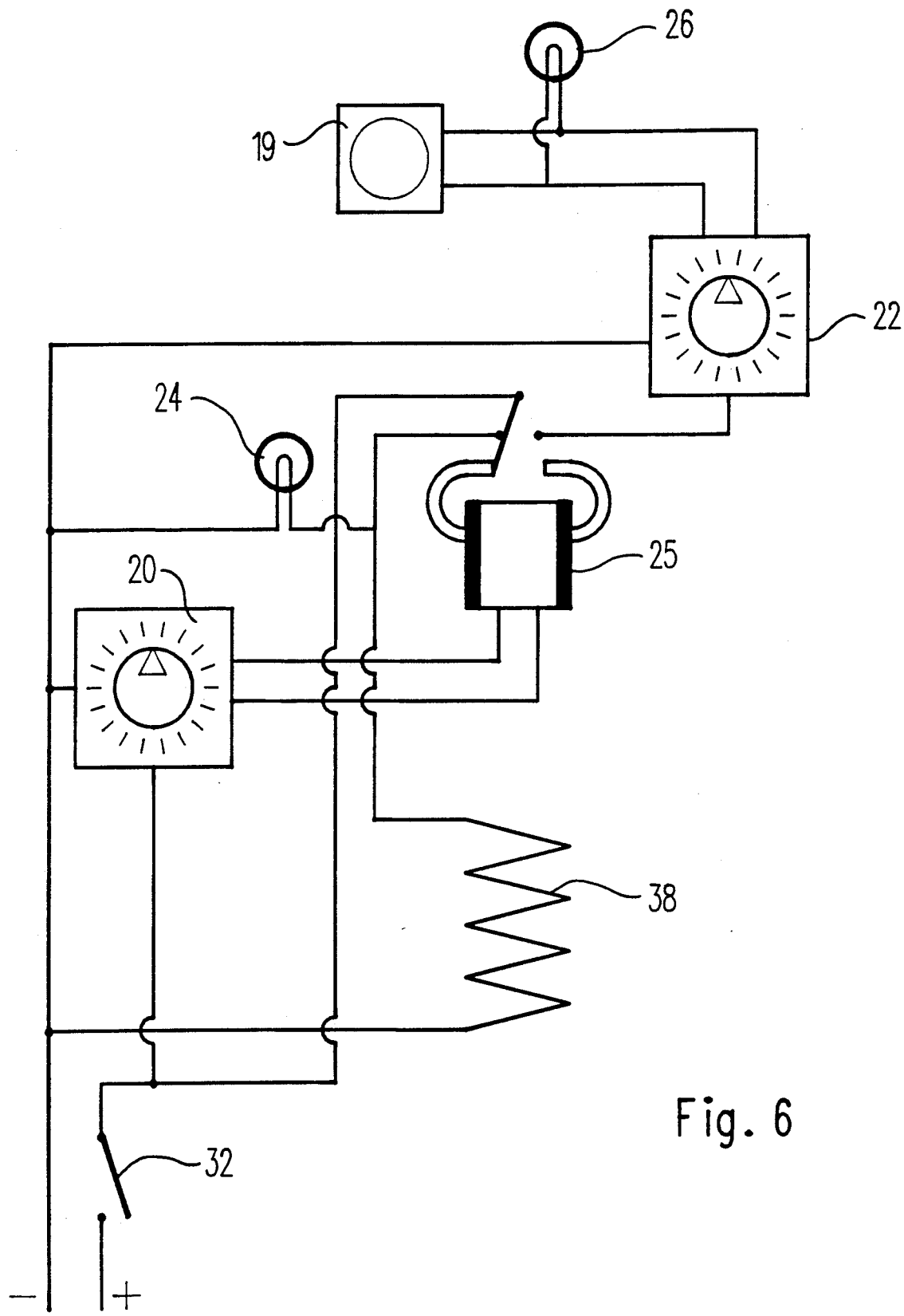
FIG. 6 is a schematic diagram illustrating the electrical components of the laminate bending device of the present invention.

FIG. 6 is a schematic diagram which illustrates the electrical components of the present invention. The power switch 32 regulates a conventional 120 VAC power supply through a power cord 36. The first timer 20 initially energizes the electrical resistance heating element 38 during the preset heating time interval. Upon expiration of the time interval preset on the timer 20, a relay 25 is energized closing a relay contact and initiating the timer 22. The timer 22 energizes the solenoid valve 19 for the preset time interval, thus controlling the cooling cycle.

Figure 7:
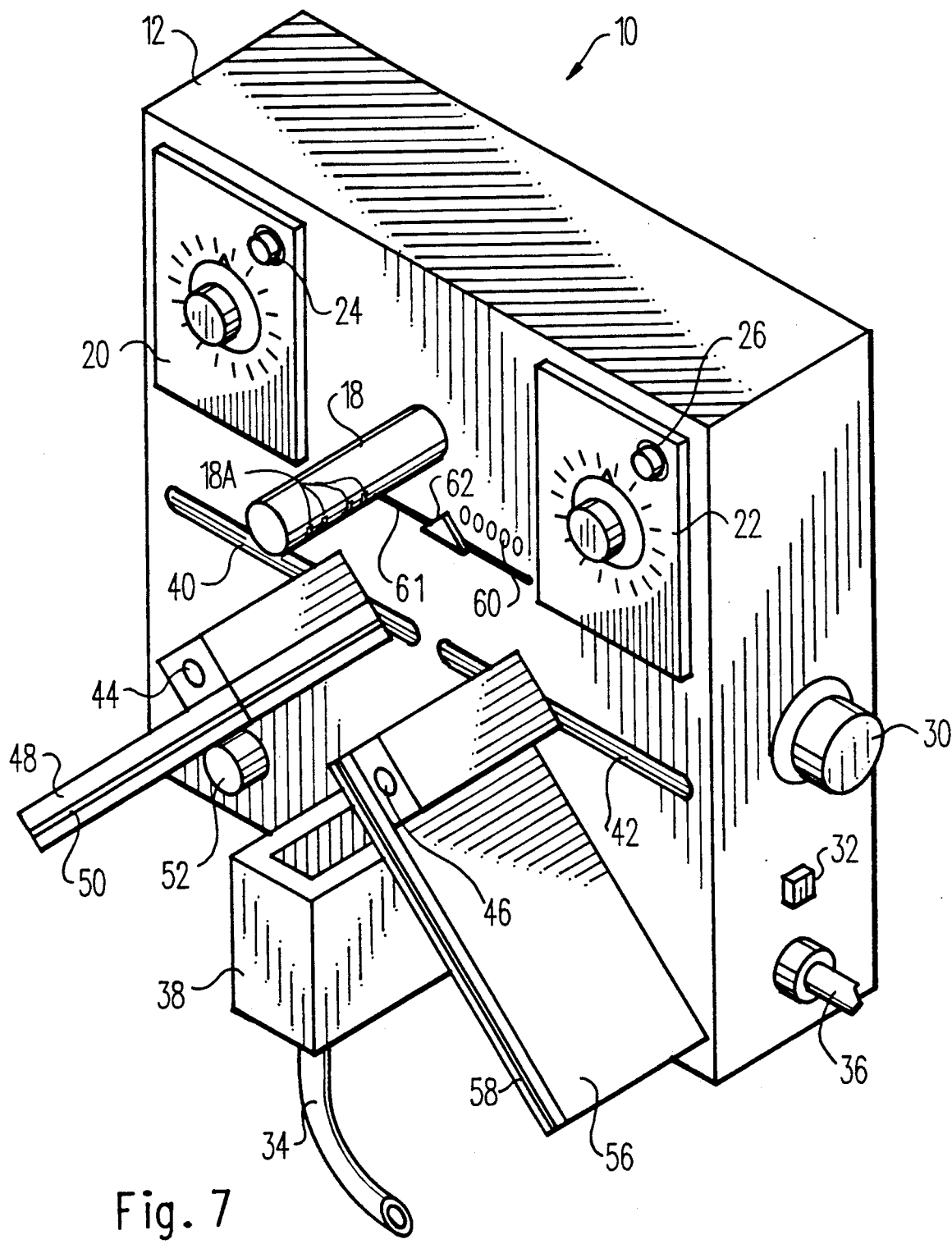
FIG. 7 is a perspective view of the laminate bending device of the present invention.

FIG. 7 is a perspective view further illustrating the laminate bending device 10 of the present invention. As shown, the heating unit 38 is in the form of an open-topped rectangular box, with an internal electrical resistance heating element. The heat is transmitted upwardly, onto the bottom surface of a laminate strip to be deformed held between the jaws 48 and 56. The heating unit 38 may comprise an interchangeable detachably mounted unit which may be provided in a variety of different heating capacities for use with different materials. Alternatively, the heating unit 38 may include a manual control for regulating the heat level. An adjustable thermostatic control may be provided for regulating the temperature of the applied heat, within the scope of the present invention. In this instance, the temperature sensor for the thermostatic control can be mounted on the housing 12, between the slits 40 and 42, so as to be proximate the heated region of a laminate strip during a bending operation.

Various alternative constructions are possible within the scope of the present invention. For example, the manual operation of the lead screw traverse mechanism illustrated in FIGS. 2 and 3 and actuated by manual control knob 30 depicted in FIG. 1, may be replaced by a motorized drive. Additionally, in place of the single rotatable lead screw 29 illustrated in FIG. 3, dual independently rotatable lead screws may be utilized. A variety of rotational mountings for the jaw supporting shafts 44 and 46, as illustrated in FIG. 2A may be utilized. For example, a variable speed electric motor mounted on the traverse block 35 may be utilized to rotate the shaft 44 at a user predetermined rate depending upon the selected laminate material and thickness. Suitable limit switches may be provided on the stop members 52 and 54 to shut off the shaft drive motors upon completion of the bending operation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A laminate bending device, comprising:
a housing;
a pair of parallel shafts extending outwardly from said housing;
rotary mounting means in said housing mounting each of said shafts for reciprocal rotation;
clamping jaw means secured on each of said shafts for holding a strip of laminate;
guide means in said housing mounting said shafts for relative linear movement to allow manual adjustment of shaft center line spacing;
and
rotary actuating means in said housing for rotating said shafts to bend a laminate strip held by said clamping jaw means.

2. The laminate bending device of claim 1, further comprising heating means secured to said housing for heating a laminate strip during bending.

3. The laminate bending device of claim 2, further comprising timing means for deactivating said heating means after a predetermined time interval.

4. The laminate bending device of claim 2, wherein said heating means comprises an electric heating element mounted on said housing between said shafts.

5. The laminate bending device of claim 2, further comprising cooling means on said housing for cooling a laminate strip after bending.

6. The laminate bending device of claim 5, further comprising timing means for deactivating said cooling means after a predetermined time interval.

7. The laminate bending device of claim 5, wherein said cooling means comprises a conduit connected to a source of compressed air and mounted on said housing to direct a flow of air on a laminate strip held by said clamping jaw means.

8. The laminate bending device of claim 7, further comprising electrically actuated valve means in said housing for controlling air flow through said conduit.

9. The laminate bending device of claim 1, wherein said guide means comprises:
lead screw means mounted for rotation in said housing;
a pair of traverse blocks in threaded engagement with said lead screw means, said shafts mounted for rotation on said traverse blocks;
and
actuating means for rotating said lead screw means to adjust spacing between said shafts.

10. The laminate bending device of claim 9, wherein said lead screw means comprises a lead screw having opposite hand threaded portions for simultaneously moving said traverse blocks in opposite directions.

11. The laminate bending device of claim 9, further comprising:
a journal bore in each of said traverse blocks receiving one end of one of said shafts;
and
a torsional coil spring surrounding each of said shafts, said springs each having one end secured to one of said traverse blocks and an opposite end secured to one of said shafts.

12. A laminate bending device, comprising:
a housing;
a pair of clamping jaws for holding a laminate strip;
means mounting said clamping jaws for relative movement with respect to said housing means to bend a laminate strip;
heating means secured to said housing means for heating a laminate strip during bending;
and
cooling means secured to said housing for cooling a laminate strip after bending.

13. The laminate bending device of claim 12, further comprising timing means for deactivating said heating means after a predetermined heating time interval.

14. The laminate bending device of claim 13, wherein said timing means includes means for activating said cooling means upon deactivation of said heating means.

15. The laminate bending device of claim 14, wherein said timing means includes means for deactivating said cooling means after a predetermined cooling time interval.

16. The laminate bending device of claim 15, wherein said predetermined heating and predetermined cooling time intervals are independently adjustable.

17. A laminate bending device, comprising:

housing means;

a pair of clamping jaws for holding a laminate strip;

means mounting said clamping jaws for relative movement with respect to said housing means to bend a laminate strip;

electric heating means on said housing means for heating a laminate strip during bending;

first adjustable timing means in said housing for deactivating said electric heating means after a user selected heating time interval;

cooling means secured to said housing for cooling a laminate strip after bending;

and second adjustable timing means in said housing for activating said cooling means upon deactivation of said electric heating means and for deactivating said cooling means after a user selected cooling time interval.

18. The laminate bending device of claim 17, wherein said cooling means comprises a conduit connected to a source of compressed air;

an electrically actuated valve for controlling air flow through said conduit;

and switching means operatively connected to said first adjustable timing means for opening said electrically actuated valve and initiating said second adjustable timing means after said user selected heating time interval.

19. The laminate bending device of claim 17, wherein each of said clamping jaws comprise an elongated block mounted adjacent one end of a rotary shaft, and provided with a slit for insertion of a laminate strip.

20. The laminate bending device of claim 17, wherein said means mounting said clamping jaws for relative movement with respect to said housing includes means for adjusting linear separation of said jaws and means for rotating each of said jaws.

* * * * *